(No Model.)
A. E. HUNT.
METHOD OF TESTING ROLLED OR FORGED METALS.
No. 499,739. Patented June 20, 1893.
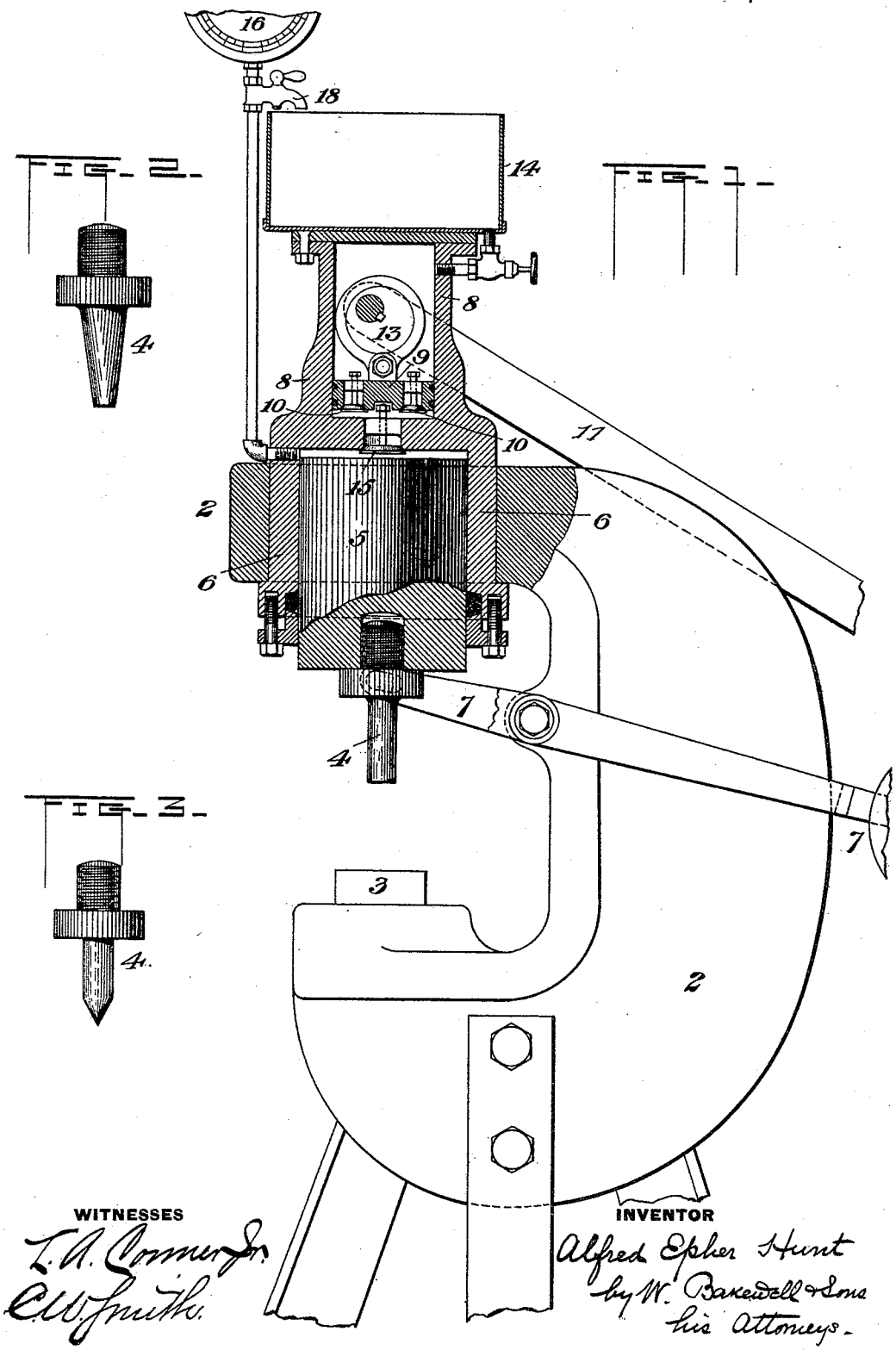
WITNESSES
INVENTOR
Alfred Ephier Hunt
by W. Bakewell & Sons
his Attorneys

UNITED STATES PATENT OFFICE.

ALFRED EPHER HUNT, OF PITTSBURG, PENNSYLVANIA.

METHOD OF TESTING ROLLED OR FORGED METALS.

SPECIFICATION forming part of Letters Patent No. 499,739, dated June 20, 1893.

Application filed December 10, 1892. Serial No. 454,771. (No model.)

*To all whom it may concern:*

Be it known that I, ALFRED EPHER HUNT, of Pittsburg, in the county of Allegheny and State of Pennsylvania, have invented a new and useful Improvement in the Art of Testing Metals, of which the following is a full, clear, and exact description, reference being had to the accompanying drawings, forming part of this specification, in which—

Figure 1 shows in vertical sectional view a machine adapted to the practice of my invention. Fig. 2 shows a drift-pin, and Fig. 3 shows a knife adapted to be used with the machine.

The tool shown in Fig. 1 is a punch.

My invention relates to a method of testing metals for their relative hardness, and thereby checking the quality of the material, and it consists in testing metals by punching, cutting, or drifting pieces of a given thickness, and comparing the force required therein with the force required to treat standard pieces in a like manner.

I have found that when samples of the same metal are rolled or hammered to a given cross-sectional thickness and are subjected to the same treatment, if the various samples are homogeneous and of the same hardness, it will take practically the same power to punch in each of them holes, or to cut indentures of given size or to enlarge to an equal extent holes of given size by means of a drift-pin; and that if non-homogeneous, or different pieces of the same section, but of different hardness and ductility, be treated in this manner, an approximately accurate test of the relative hardness, the shearing strength, and of the ductility relative to tensile strength of the pieces can be made by noting the relative degrees of power required to punch such holes, or to cut such indentures, or to drift the hole to a given extent. I find this test to be especially applicable to soft steel, which is liable to have harder higher-carbon steel mixed with it, or to be non-homogeneous in quality.

By the method of testing described above, I can test pieces cut from the crop-ends of a piece rolled from each ingot of steel used in any given lot of material to be tested; or, if necessary, pieces can be cut from crop-ends taken from each end of large plates or bars; and tests can be made of their relative hardness, which, in the case of soft structural steel, will be an indication of its ductility, and thereby of the quality of the metal. Tests can also be made by punching, cutting or drifting directly the finished plates or bars themselves, but in any case the ease of procuring samples to be tested and the absence of special expense therein, constitute a marked practical advantage of my invention.

By the terms "plates and bars" I mean to include such articles as rolled plates, I-beams, angle bars and other forms of bars and structural metal.

In order to prepare for the practice of my method I make a series of metal pieces of chosen standard cross-sectional thickness, and by known methods of testing I ascertain and record their ductility as compared with tensile strength. For this purpose, pieces are chosen of varying degrees of ductility with relation to tensile strength. By ductility in this connection I mean capacity of the particles of the metal, when under strain above the elastic limit, to flow one upon the other. These constitute the standard pieces, and when prepared I subject them, by the action of a machine such as hereinafter described, to the operation of cutting and punching with cutting or punching tools of given standard area, or holes already formed therein of given size are drifted so as to enlarge them to a given larger size, and the power exerted in so treating them is observed and noted.

Standard pieces are prepared preferably of a number of different cross-sectional thicknesses, and the results recorded, so that in practice they may be adapted to be compared with plates or bars of any thickness ordinarily occurring in commercial work. These standard test pieces can be made once for all as to tools of given cross-sectional area, and the work of making them and recording the results above indicated will be perfectly plain and easy to one skilled in the art on reading this description.

To test metal plates or bars, a piece thereof, after it has been reduced to or approximately to known cross-sectional thickness, is taken and it is punched, cut, or holes already formed therein of given size are drifted, and the power exerted in so treating it is observed. This punching, cutting or drifting of the plates or bars to be tested is done in the same manner as in ascertaining the results of testing the standard pieces, i. e. the work is performed with a tool of the same kind and of the same size in cross section. The readings thus obtained, when compared with the previously ascertained records of the results of treating standard pieces of the same cross-sectional thickness, will give a reliable indication of the shearing strength and of the hardness and ductility relative to tensile strength of the samples tested. It is not necessary that this mode of testing should be used to the exclusion of the ordinary tensile and bending tests now recognized as the standards in specifications for structural steel, but it may be used as an additional or supplementary test; for, owing to the expenses in planing and preparing the test specimens, and the loss of time occasioned thereby, it is impracticable to get merely by methods heretofore used as many tests of any given lot of metal as experience has proved to be necessary in order to be certain that the steel is homogeneous in quality. My improved method affords a quick, cheap, and easy system of testing, which can be readily practiced upon so many pieces as to quite certainly prove the quality of the entire lot of metal to be tested.

The apparatus which I prefer to use is of the type of the known portable hydraulic punch or riveting machine, having an oil-pump which forces oil until very heavy pressures are obtained upon the sectional area of a piston, which at its exterior end is armed with the drift-pin or with the punch or knife for forcing or cutting the metal. By means of either a dial, pressure or mercury gage, the pressure per square inch upon the piston can readily be calculated, and from this the power exerted to produce the given work can be determined. It should be understood, however, that my invention is not dependent upon the use of a machine of any particular construction; and that while I describe a suitable machine, its details of construction in nowise limit my invention. Thus, instead of supplying the power by means of a liquid-forcing pump, it may be supplied by compression of air or steam, or the tools may be actuated by mechanism, connected with the levers of an ordinary testing-machine or other gage. Therefore, so far as the machine is concerned, its essential elements are only a tool of the character indicated, means for supplying force thereto, and a gage for measuring the force applied in testing. By the word "gage" as used herein, I intend to include any means for measuring the force exerted, whether the same be a dial-gage, a mercury-gage, a spring, torsional or weighted balance, or any other suitable measuring instrument for this purpose.

In the accompanying drawings, which represent a machine which may be used to advantage in the practice of my invention, 2 represents the machine-frame, and 3 is a bed-die or anvil on which the piece to be tested is placed.

4 is a punch fixed to the end of a piston which operates in a cylinder 6, and is provided with a counterbalancing lever 7. For the purpose of actuating the piston 5, I employ a pump, comprising a pump-cylinder 8, having a piston 9 provided with valves 10 and adapted to be reciprocated by a lever 11 and cam 13, so as to force the oil or other liquid received from a reservoir 14 into the cylinder 6 through a port governed by a check-valve 15. The piston 5 is of considerably larger area than is the pump-piston, and by reason thereof and of the leverage afforded by the hand-lever, a sufficiently great pressure may be communicated to the punching-tool to punch the test-pieces placed upon the bed-die or anvil. After the piece has been punched, by opening a valve 18 the counterbalance 7 will elevate the piston and punch and will displace the liquid from the cylinder into the reservoir. The pressure in the cylinder 6 at the moment of punching may be observed by means of a pressure-gage 16 connected with the cylinder; and by a simple calculation, knowing the area of the piston 5, the force transmitted to the tool may be determined.

In Figs. 2 and 3 I show respectively a drift-pin and a cutting-tool, which, as above explained, may be substituted for the punch.

I claim—

The method herein described of testing rolled or forged metal plates or bars, which consists in subjecting such plates or bars after final production, or pieces, crop-ends, or rejects cut from or rolled like such plates or bars, to punching, cutting or drifting, and comparing the force required therefor with that required to treat standard pieces of corresponding thickness, similarly produced, and of known quality, in like manner, substantially as set forth.

In testimony whereof I have hereunto set my hand.

ALFRED EPHER HUNT.

Witnesses:
W. B. CORWIN,
THOMAS W. BAKEWELL.